United States Patent
Suzuki et al.

(10) Patent No.: US 6,757,697 B1
(45) Date of Patent: Jun. 29, 2004

(54) METHOD AND EQUIPMENT FOR FILE UPDATING USING COMMON INSTANCE MANAGEMENT SCHEME

(75) Inventors: Yumi Suzuki, Kawasaki (JP); Miyuki Nishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/565,866

(22) Filed: May 5, 2000

(30) Foreign Application Priority Data

Aug. 24, 1999  (JP) ............................................. 11-237306

(51) Int. Cl.⁷ ........................... G06F 12/00; G06F 17/30
(52) U.S. Cl. ....................... 707/203; 707/100; 707/102
(58) Field of Search .............................. 700/9, 17, 83, 700/24, 27, 124; 379/242; 707/100, 102, 203

(56) References Cited

U.S. PATENT DOCUMENTS 6,161,148 A  * 12/2000  Pratt et al. ................... 709/315
6,484,186 B1 * 11/2002  Rungta ........................ 707/203

FOREIGN PATENT DOCUMENTS

JP          7-210386         8/1995

* cited by examiner

*Primary Examiner*—Meng-Al T. An
*Assistant Examiner*—Diem Cao
(74) *Attorney, Agent, or Firm*—Katten Muchin Zavis Rosenman

(57) ABSTRACT

A method and equipment for file updating is disclosed, which enables data conversion necessary for the file update without requiring particular consideration on instance classes. The method is applicable to updating a program file for switching service in a switching system. In a common instance management object, a plurality of instances are generated to register. States of the registered instances are stored in a bitmap for instance blocking management. Individual instance management objects are respectively provided corresponding to each instance class of instances registered in the common instance management object. Generation states are stored in bitmaps for instance blocking management. Each bitmap is prepared within each individual instance management object, i.e. instance type by type. Thus objects for file update are identified.

4 Claims, 6 Drawing Sheets

METHOD AND EQUIPMENT FOR FILE UPDATING USING COMMON INSTANCE MANAGEMENT SCHEME

FIELD OF THE INVENTION

This invention relates to a method and equipment for updating a file in a switching system in which an object oriented call processing model is adopted, using a common instance management scheme.

BACKGROUND OF THE INVENTION

In this explanation of the invention, a term 'file update' means updating a program file for switching service without affecting normal switching service to the users.

In a switching system, file update is carried out mainly when it is required (1) to add new function, (2) to modify existent function, or (3) to improve switching function.

Referring to FIG. 1, a conventional method of file update is explained hereafter.

At the start of file update from an old subsystem I to a new subsystem II, call processing is carried out by old subsystem I in a single subsystem to continue normal call processing operation, and a new system file is initiated in new subsystem II (refer to stage 1).

In old subsystem I where the system is in operation, a request for starting file update is issued to a generic update controller (GUC) 3 by a maintenance operator (Step S1). Generic update controller 3 responds to the request to send a permission of starting file update to the old subsystem which is referred to as a user 2 (step S2).

During the above period, a new system file is initiated in new subsystem II (step S3). This is followed by the transfer of data which has no direct relation with the call processing (called B-level data) from user 2 in old subsystem I to user 2' in new subsystem II (stage 2).

Then, at stage 3, generic update controller 3 in old subsystem I informs user 2 the decision of file update execution (step S4), and issue a request of updating data to maintenance operator 1 (step S5). In response to the above request, maintenance operator 1 inputs a command to request generic update controller 3 to start data update (step S6).

At stage 4, generic update controller 3 indicates user 2 to suspend call processing (step S7). Thus call processing is suspended (step S8).

Now, the system is switched from old subsystem I to new subsystem II, and generic update controller 3 is also switched to generic update controller 3' in new subsystem II (step S9). Then, at stage 5, data transfer and replacement of data are carried out, in which data having direct relation with call processing from user 2 in old subsystem I to user 2' in new subsystem II are included (step S10).

File update is thus completed, followed by restart and initialization of call processing (stage 6). At stage 6, completion of file update is reported from generic update controller 3' in new subsystem II to user 2' in new subsystem II (Step S11). Also, completion information of generic update is sent from a maintenance operator 1 to user 2' in new subsystem II (step S12).

The entities of generic update controller 3 and 3' are composed of programs implemented in a switching system. The above-mentioned functions of generic update controller 3 and 3' are realized by executing these programs.

There have been problems in a conventional method: during the execution of file update at stage 5 in the above file update procedure, a large memory area is required for data management, and long time is consumed in retrieval operation.

SUMMARY OF THE INVENTION

It is an object of the invention to provide a method for file updating and equipment therefor by the use of a common instance management scheme to solve aforementioned conventional problems.

It is another object of the invention to provide a method for updating a switching program file with effective utilization of memory area.

A file update method and equipment according to the present invention enables to reduce required memory area (i.e. bitmaps for blocking management, and instance address data related to the self instance) by introducing individual instance management objects; and enables data conversion in file update without requiring particular consideration on each class of instance in a common instance management object.

Preferably, a method for file updating in a switching system having programs for switching service is provided including the steps of; generating and registering a plurality of instances into a common instance management object; indicating generation states of the above registered plurality of instances in a bitmap for instance blocking management; and storing each generation state indicated in the bitmap for instance blocking management into each individual instance management object corresponding to each own class of the instance registered in the common instance management object to identify objects of the file update.

Preferably, the generation state indicated in the bitmap for instance blocking management is denoted by flag bits.

Preferably, the generation state indicated in the bitmap for instance blocking management is stored in the form of an address of the instance after the update.

Furthermore, as a feature of the present invention, a common instance management equipment is provided in a switching system having programs for conducting switching service and enabling to generate and release instances in consideration of different plurality of classes. The common instance management equipment includes; a common instance management object having instance areas to store generation states (or blocked states) of generated instances and also having a bitmap for instance blocking management into which flag bits are raised corresponding to the generated instances; and individual instance management objects each provided corresponding to respective plurality types of generated instances. In each of said individual instance management object, a bitmap for instance blocking management is provided corresponding to each instance type, to manage the generation states (or blocked states) of instances.

Still further, as another feature of the invention, individual instance management objects each provided corresponding to respective plurality types of generated instances. Each individual instance management object includes instance addresses of each instance type for managing the generation states (blocked states) of the instances.

Other features and advantages of the present invention will become apparent in the following description on the preferred embodiments.

BRIEF DESCRIPTION OF THE DRAWINGS

FIG. 9 shows an example of data conversion of instance type =A, conducted by instance A management object 32a.

DETAILED DESCRIPTION OF THE INVENTION

The embodiments of the present invention are described hereinafter with the reference to the accompanied charts and drawings, wherein like numbers and symbols refer to like parts.

Figure 1:
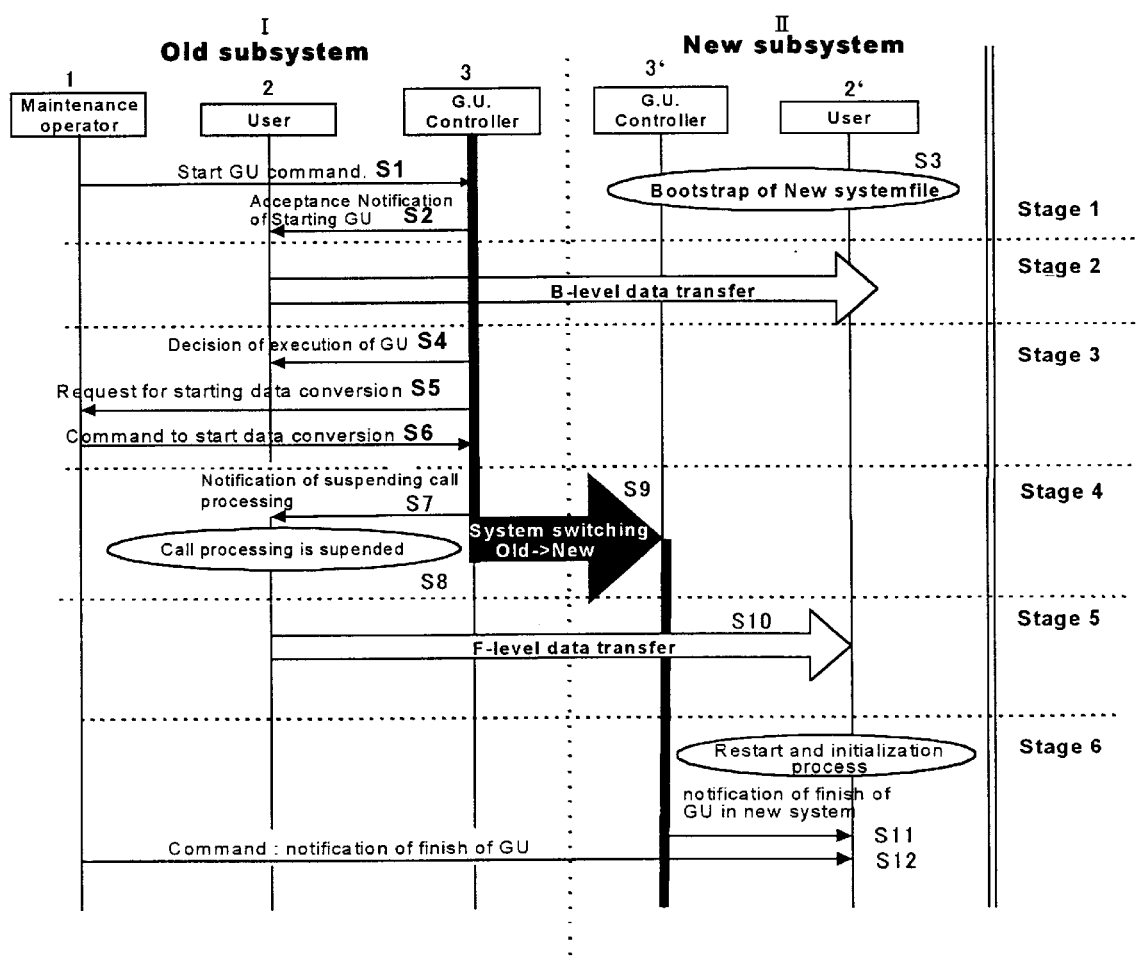
FIG. 1 shows a conventional method of file update.

Before describing the embodiments of the invention, a process at stage 5 in FIG. 1 of a conventional file update procedure is explained for better understanding of the present invention.

Figure 2:
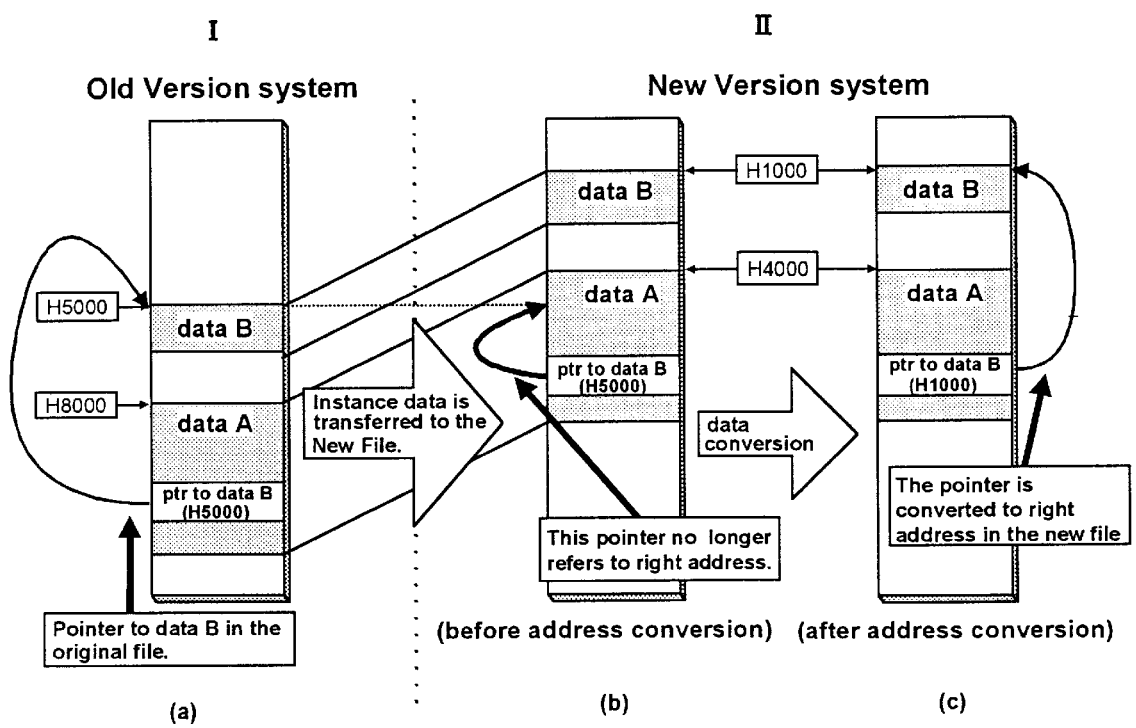
FIG. 2 shows a detailed procedure for file update in stage of FIG. 1.

In FIG. 2, there is shown a concrete explanation on the file update process at stage 5 in FIG. 1. In a switching program which is designed on the basis of conventional object oriented models, data conversion is required against memory areas which are generated call by call. Hereinafter the area is referred to as 'instance'.

At stage 4 in FIG. 1, information related to the above-mentioned instances is transferred from old subsystem I to new subsystem II. Note that the address data retained in the instances is effective only in old subsystem I. For example, in FIG. 2 (a), an address pointer in which data points to data B is located after data area A in old subsystem I, this address data is effective only in old subsystem I.

As shown in FIG. 2 (b), addresses in an instance of new subsystem II are displaced from those of old subsystem I. If address data remain unchanged, an address data which points to an address area of data B in old subsystem I points to an address area which has no relation with data B in new subsystem II.

Therefore, when data transfer to new subsystem II takes place, data conversion is required as shown in FIG. 2 (c), instead of leaving data unchanged as shown in FIG. 2 (b), so that an address data in a instance properly points to the original address area in new subsystem II.

In the case of FIG. 2 (b), above data conversion is performed by an object which manages each instance.

Figure 3:
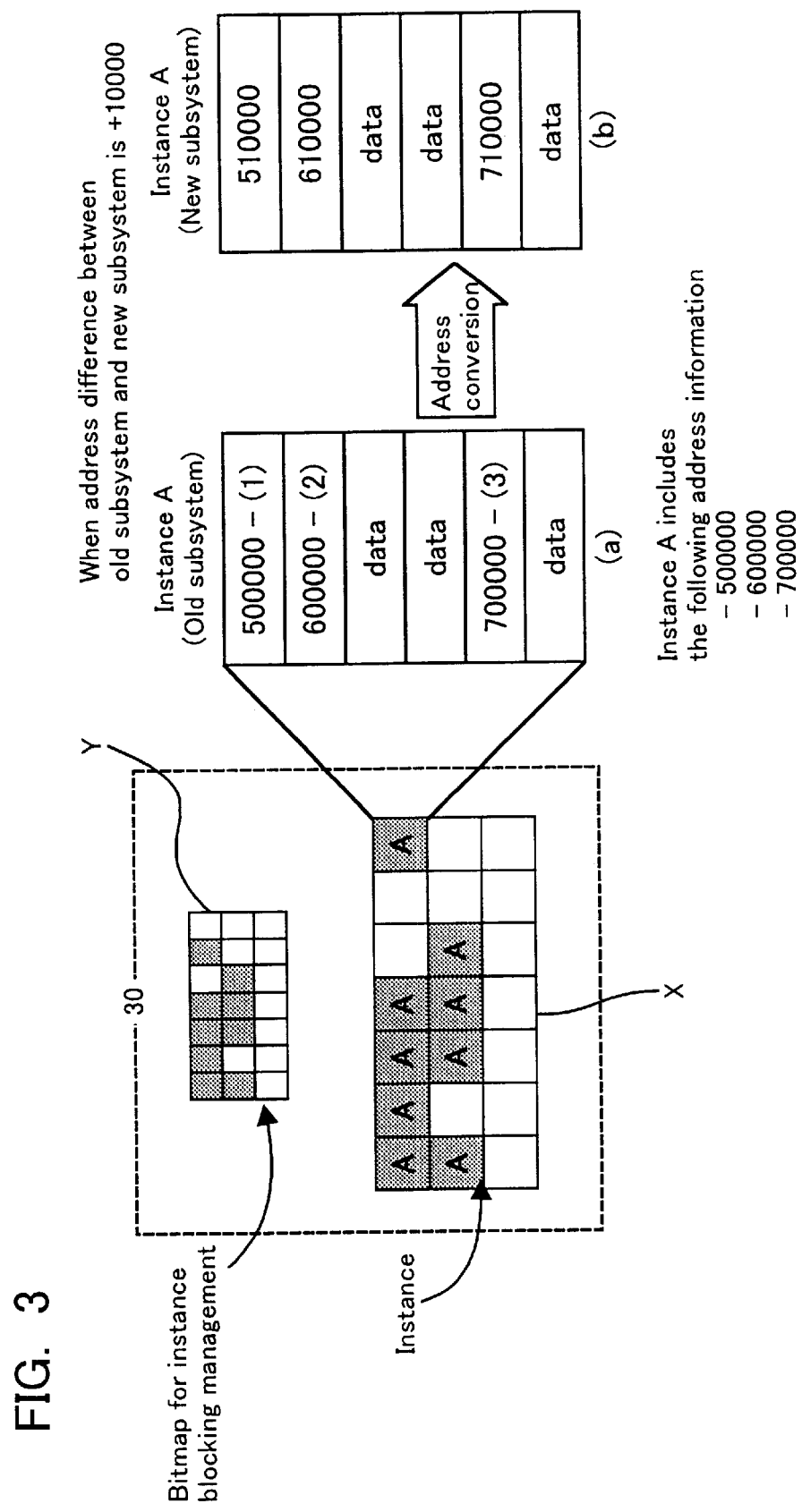
FIG. 3 shows an example of instance management object 30 to handle a single instance class.

In FIG. 3, there is shown an example in which instance management object 30 handles a single instance class. This instance management object 30 is also implemented in a switching system. In this case, management object 30 for instance A is constituted considering the type of instance A against all objects (refer to FIG. 3 (a)).

It will be understood that the data to be converted by instance A management object 30 are address data (1), (2) and (3) (in FIG. 3 (a)) in each instance managed by instance A management object 30. Accordingly, when a difference between an address in old subsystem I and the corresponding address in new subsystem II is uniformly +10000, instance management object 30 performs address conversion by uniformly adding +10000 to the address data (1), (2) and (3) in each instance (i.e. conversion from FIG. 3 (a) to FIG. 3 (b)).

In FIG. 3, a bitmap area Y is prepared to indicate blocking condition of each instance, corresponding to area X which stores instances, to identify target instances for conversion processing.

Here, if an instance management scheme of handling instance classes is applied, it is required to provide instance management object independently to each instance class. Also, it is required to estimate and prepare in advance areas for accommodating instances to manage its own instances. This may reduce efficiency in using memory area.

Accordingly, the present invention aims to provide a file update method to solve the above problems, especially, as a feature of the invention, based on a common instance management scheme.

Figure 4:
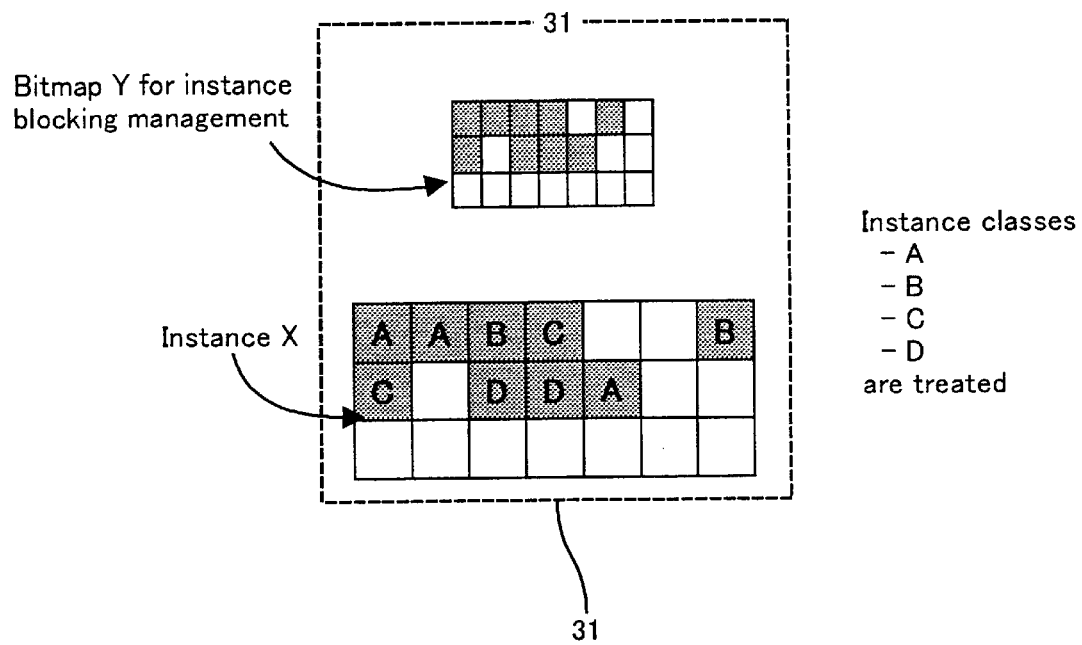
FIG. 4 shows a common instance management object 31 in which a common instance management scheme of the present invention is applied.

In FIG. 4, there is shown a common instance management object 31 in which a common instance management scheme is applied. In the same way as instance management object 30 shown in FIG. 3, there are provided instance area X and bitmap Y for instance blocking management which indicates blocked (i.e. in use) condition of each instance area X.

In this FIG. 4, A, B, C, . . . shown in instance area X denote respective instance classes. If there is not provided any additional data related to instance class, data conversion is not possible.

To cope with the above problem, the embodiments of the present invention provides individual instance management objects 32 separately to common instance management object 31.

Figure 5:
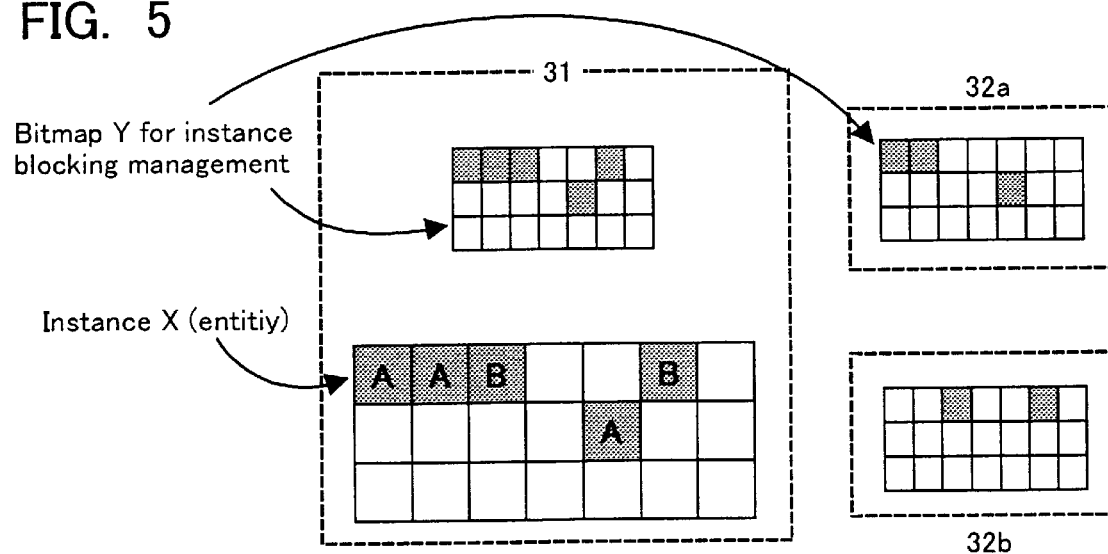
FIG. 5 shows the first embodiment of the present invention.

In FIG. 5, the first embodiment of the invention is shown. Generation states of each instance type are stored in an instance area X of common instance management object 31. Also, a bit flag is raised in bitmap Y for instance blocking management, corresponding to the generation of each instance.

An example having instance type A and type B is shown in an embodiment of FIG. 5. Corresponding to respective instance A and instance B, individual instance management objects 32a and 32b are provided respectively.

Individual instance management object 32a stores the generation states of instances of instance type A, while individual instance management object 32b stores the generation states of instances of instance type B.

In respective individual instance management objects 32a and 32b, a bit flag is raised on a bit location, denoting blocked state of an instance in a corresponding location of instance area X.

Thus, by referring to individual instance management objects 32a and 32b which respectively correspond to instance types A and B, effective utilization of memory area can be attained. Inside each individual instance management objects 32a and 32b, particular consideration to the instance type is not required.

Figure 6:
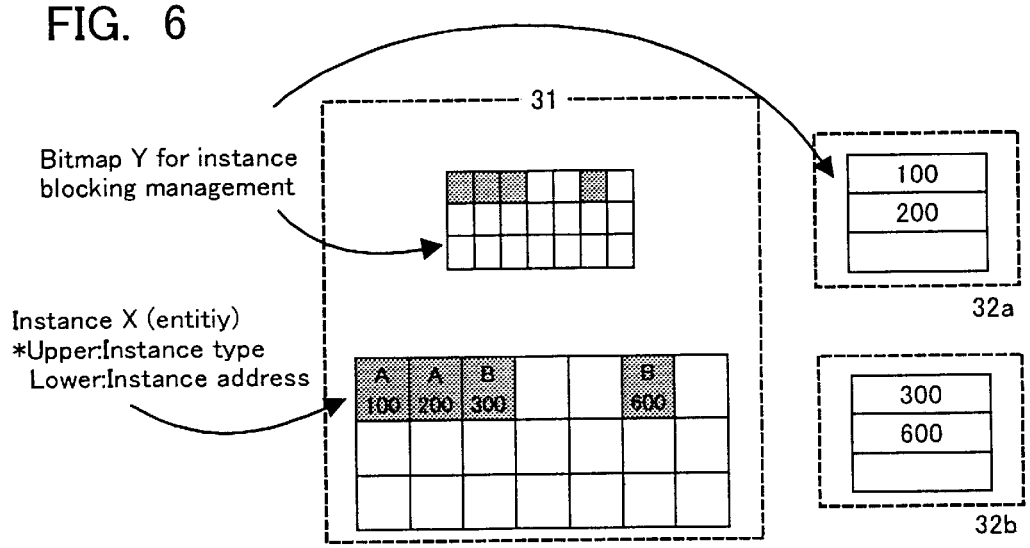
FIG. 6 shows another embodiment of the present invention.

In FIG. 6, another embodiment of the present invention is shown. In this embodiment, an instance type and an address are registered to indicate a generation state of an instance in instance area X. In respective individual instance management objects 32a and 32b, addresses of the generated instances are stored to indicate each generation state of the instances by each instance type.

Accordingly, also in the embodiment shown in FIG. 6, particular consideration to instance types is not required. Thus a file update method for switching program is obtained making use of an advantage of effective utilization of memory area provided in common instance scheme.

Now, a flow of generating instance management object is explained hereafter, taking the above first embodiment of the invention as an example.

Figure 7:
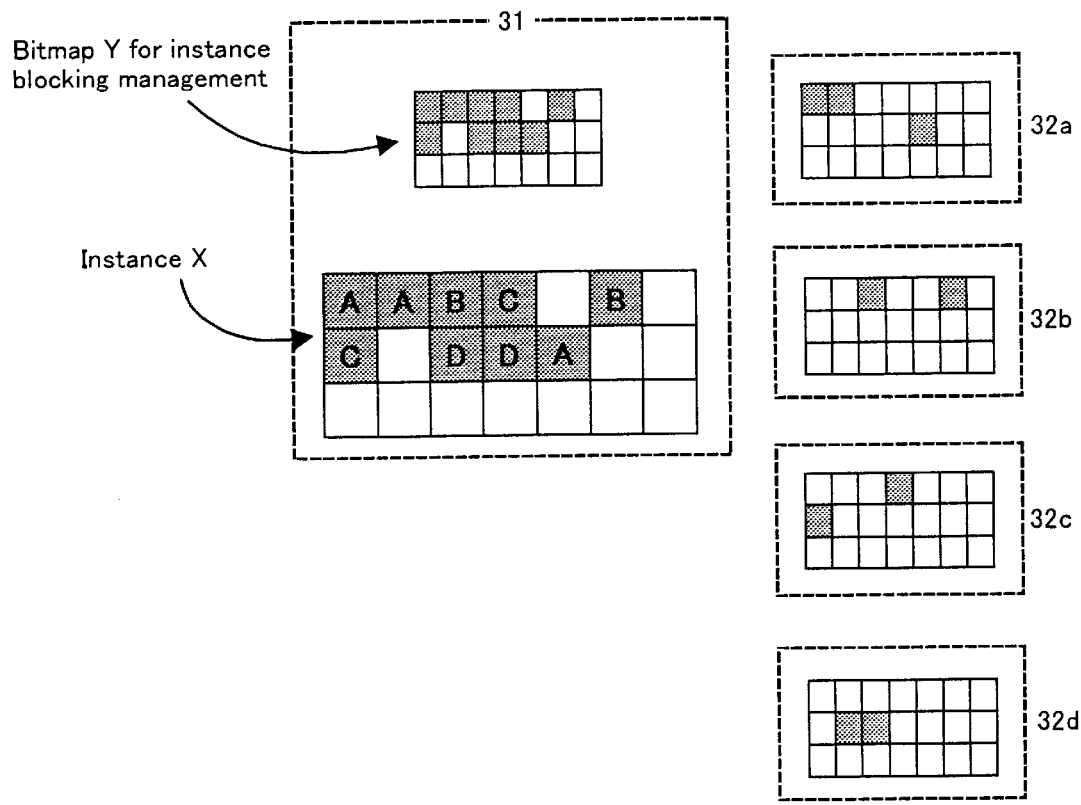
FIG. 7 shows a concrete example of the first embodiment of the invention.

In FIG. 7, a concrete example of the first embodiment is shown. Here, instance types A, B, C and D are used in this example. Accordingly, there are provided individual instance management objects 32a, 32b, 32c and 32d, each corresponding to instance types A, B, C and D.

Namely, besides common instance management object 31, individual instance management objects 32a, 32b, 32c and 32d are provided, which respectively correspond to the above instance types. Here, in order to save required memory area, only bitmap is provided in each instance management object by each instance class for storing information on blocked instances. Instance object X itself is owned by the common instance management object.

Figure 8:
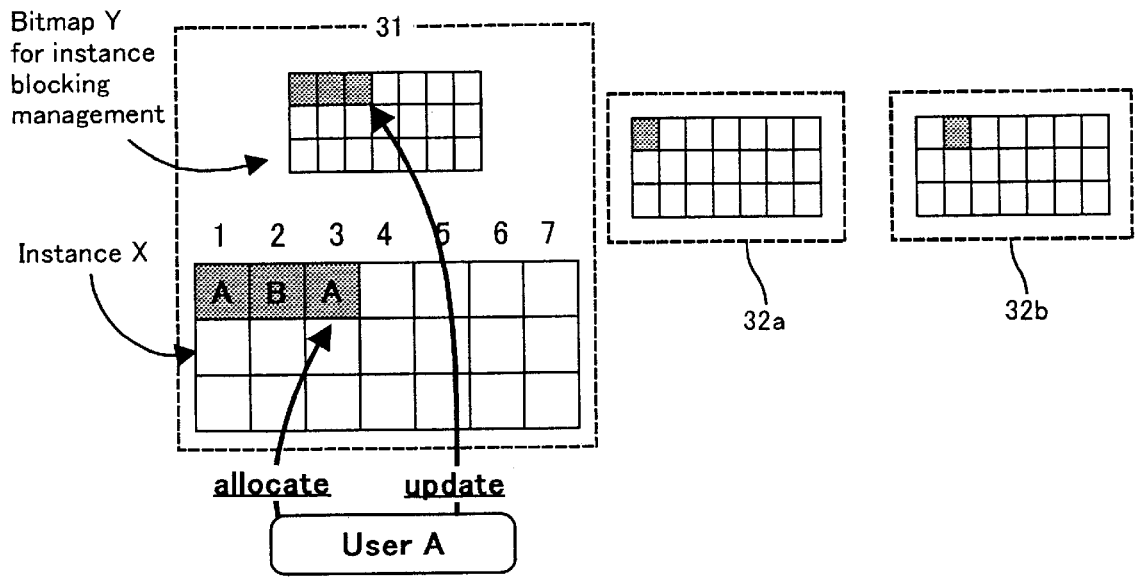
FIG. 8 shows a chart for explaining a request to common instance management object 31 to generate an instance originated by a user A (instance type: A).

In FIG. 8, there is shown a chart in which a user A (instance type: A) requests common instance management object 31 to generate an instance.

It is assumed in FIG. 8 that the third instance is to be generated according to the request from user A. User A (instance type: A) requests common instance management object 31 to generate an instance.

Then, common instance management object 31 generates instance A to register in instance area X, and to store into a flag bit corresponding to the number of the generated instance in instance blocking management bitmap Y.

User A informs individual instance management object 32a of the generated number of times of instance, to store in a blocking management bitmap for instance A retained by instance object A management object 32a.

Figure 9:
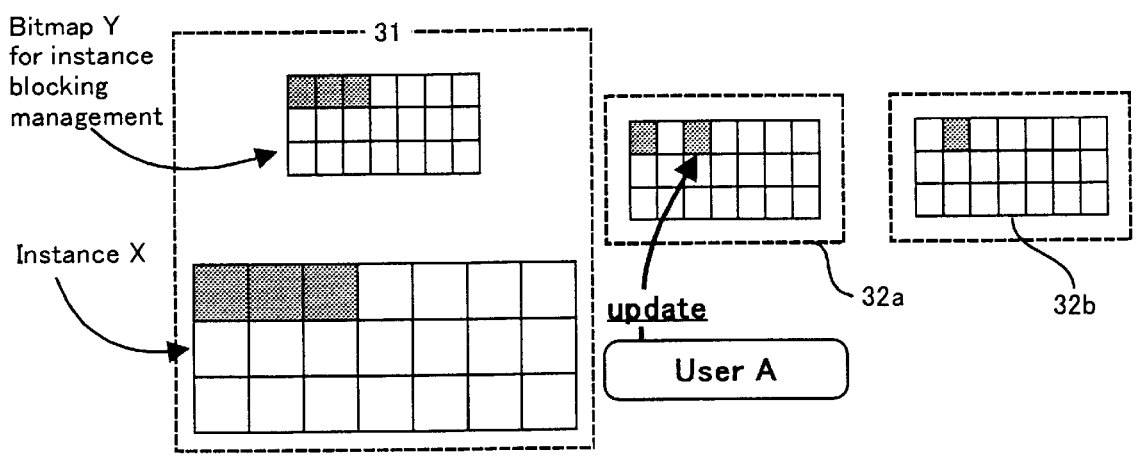

Each individual instance management object performs the data conversion for file update. In the case of FIG. 9, there is shown an example that instance A management object 32a performs data conversion on instance type=A.

On the other hand, common instance management object 31 does not perform the data conversion. Instance A management object 32a can identify which instance(s) corresponds to its own type A in common instance management using bitmap data stored in a bitmap for instance blocking management.

In the example shown in FIG. 9, it can be identified, using bitmap data for instance blocking management in instance A management object 32a, that the first instance and the third instance are of instance type A. Also, it can be identified in instance B that the second instance is of instance type B.

Because instance A management object 32a keeps detailed information on the type of instance A, further data conversion process is performed similar to the procedure shown in FIG. 3.

As described above, the present invention uses common instance management scheme, in which particular consideration on instance classes is not necessary in the process of generating or releasing instances.

Also, according to the present invention, wasted use of instance memory area can be reduced to the minimum, and a file update method easy to cope with addition of new functions is realized.

Having been described the embodiments of the invention in accordance with the accompanied charts and drawings, any suitable modification and equivalents may be resorted to the scope of the invention. All features and advantages of the invention which fall within the scope of the present invention are covered by the appended claims.

What is claimed is:

1. A method for updating a file in a switching system having programs for switching service including the steps of:

generating a plurality of instances into a common instance management object to register;

indicating generation states of said plurality of instances in a bitmap for instance blocking management;

storing each said generation state indicated in said bitmap for instance blocking management into each individual instance management object corresponding to responding to respective own class of said instance registered in said common instance management object;

identifying objects of the file to be updated by referring to each individual instance management object corresponding to the generation states of said plurality of instances in the bitmap.

2. The method according to claim 1, wherein said generation state indicated in said bitmap for instance blocking management is denoted by a flag bit.

3. The method according to claim 1, wherein said generation state indicated in said bitmap for instance blocking management is stored in the form of an address of instance after the update.

4. A switching system having programs for conducting switching service comprising:

a means for generating a plurality of instances into a common instance management object;

a bitmap for instance blocking management for indicating generation states of said plurality of instances; and bitmaps for instance blocking management each provided for each instance type, for managing said generation state or a blocked state of instances of said own instance type, whereby said switching system executes a file update using a common instance management scheme including the functions of:

referring to said bitmaps for instance blocking management at the time of file update, and obtaining instance addresses according to each instance type.

* * * * *